US012720406B2

(12) United States Patent
Shinozaki

(10) Patent No.: US 12,720,406 B2
(45) Date of Patent: Aug. 25, 2026

(54) INFORMATION PROCESSING SYSTEM, INFORMATION PROCESSING DEVICE, AND INFORMATION PROCESSING METHOD

(71) Applicant: SONY SEMICONDUCTOR SOLUTIONS CORPORATION, Kanagawa (JP)

(72) Inventor: Katsuya Shinozaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 456 days.

(21) Appl. No.: 18/261,744

(22) PCT Filed: Dec. 24, 2021

(86) PCT No.: PCT/JP2021/048265
§ 371 (c)(1),
(2) Date: Jul. 17, 2023

(87) PCT Pub. No.: WO2022/163264
PCT Pub. Date: Aug. 4, 2022

(65) Prior Publication Data
US 2024/0080746 A1 Mar. 7, 2024

(30) Foreign Application Priority Data
Jan. 27, 2021 (JP) ................................ 2021-010860

(51) Int. Cl.
*H04W 40/24* (2009.01)
*H04W 48/02* (2009.01)

(52) U.S. Cl.
CPC .......... *H04W 40/24* (2013.01); *H04W 48/02* (2013.01)

(58) Field of Classification Search
CPC ... H04W 40/24; H04W 40/248; H04W 48/02; H04W 84/10
See application file for complete search history.

(56) References Cited

U.S. PATENT DOCUMENTS

2016/0088424 A1* 3/2016 Polo ...................... H04W 88/04 455/41.1
2018/0077494 A1* 3/2018 Suyama ............. H04L 41/0803
(Continued)

FOREIGN PATENT DOCUMENTS

CN 110213758 A * 9/2019 .............. H04W 4/80
JP 2017-041758 A 2/2017

OTHER PUBLICATIONS

Machine Translation of CN 110213758 A (Year: 2019).*
(Continued)

*Primary Examiner* — Paul H. Masur
(74) *Attorney, Agent, or Firm* — CHIP LAW GROUP

(57) ABSTRACT

Provided is an information processing system which includes a plurality of information processing devices each having connection permission device information including identification information of a connection permission device to which connection by wireless communication is to be permitted. In a case in which predetermined updating is performed for the connection permission device information of a predetermined information processing device from among the plurality of information processing devices, another information processing device from among the plurality of information processing devices acquires contents of the predetermined updating and performs updating for the connection permission device information with the same contents as those of the predetermined updating.

16 Claims, 7 Drawing Sheets

(56) References Cited

U.S. PATENT DOCUMENTS

2020/0099657 A1* 3/2020 Kharvar ................ H04L 63/164
2020/0107262 A1* 4/2020 Shaw .................... H04W 76/28

OTHER PUBLICATIONS

International Search Report and Written Opinion of PCT Application No. PCT/JP2021/048265, issued on Mar. 8, 2022, 09 pages of ISRWO.

* cited by examiner

INFORMATION PROCESSING SYSTEM, INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2021/048265 filed on Dec. 24, 2021, which claims priority benefit of Japanese Patent Application No. JP 2021-010860 filed in the Japan Patent Office on Jan. 27, 2021. Each of the above-referenced applications is hereby incorporated herein by reference in its entirety.

TECHNICAL FIELD

The present technology relates to an information processing system, an information processing device, and an information processing method, and particularly to an information processing system, an information processing device, and an information processing method that make it possible to reduce labor and time taken for updating of white lists of a plurality of information processing devices with the same contents.

BACKGROUND ART

In PTL 1, disclosed is a communication device which generates a white list to be used for determination of whether or not connection to another device is to be permitted.

CITATION LIST

Patent Literature

[PTL 1]
Japanese Patent Laid-Open No. 2019-068417

SUMMARY

Technical Problem

In a case in which updating of white lists individually possessed by a plurality of information processing devices with the same contents is performed, if the updating is performed individually for each of the information processing devices, then much labor and time are required.

The present technology has been made in view of such a situation and makes it possible to reduce labor and time taken for updating of white lists of a plurality of information processing devices with the same contents.

Solution to Problem

The information processing system of a first aspect of the present technology is an information processing system including a plurality of information processing devices each having connection permission device information including identification information of a connection permission device to which connection by wireless communication is to be permitted, in which, in a case in which a predetermined information processing device from among the plurality of information processing devices performs predetermined updating for the connection permission device information of the predetermined information processing device, another information processing device from among the plurality of information processing devices acquires the contents of the predetermined updating and performs updating for the connection permission device information of the other information processing device with the same contents as those of the predetermined updating.

The information processing system of the first aspect of the present technology includes the plurality of information processing devices each having connection permission device information including identification information of a connection permission device to which connection by wireless communication is to be permitted. In a case in which the predetermined updating is performed for the connection permission device information of the predetermined information processing device from among the plurality of information processing devices, the other information processing device from among the plurality of information processing devices acquires the contents of the predetermined updating and performs updating for the connection permission device information with the same contents as those of the predetermined updating.

The information processing device of a second aspect of the present technology is an information processing device including a processing section that has connection permission device information including identification information of a connection permission device to which connection by wireless communication is to be permitted and transmits, in a case in which the processing section performs predetermined updating for the connection permission device information, contents of the predetermined updating to another information processing device.

The information processing method of the second aspect of the present technology is an information processing method performed by a processing section included in an information processing device. The processing section has connection permission device information including identification information of a connection permission device to which connection by wireless communication is to be permitted. The information processing method includes transmitting, in a case in which predetermined updating is performed for the connection permission device information, contents of the predetermined updating to another information processing device.

In the information processing device and the information processing method of the second aspect of the present technology, the connection permission device information is provided which is configured from identification information of a connection permission device to which connection by wireless communication is to be permitted, and in a case in which predetermined updating is performed for the connection permission device information, the contents of the predetermined updating are transmitted to the other information processing device.

DESCRIPTION OF EMBODIMENT

In the following, an embodiment of the present technology is described with reference to the drawings.

<Embodiment of Information Processing System>

Figure 1:
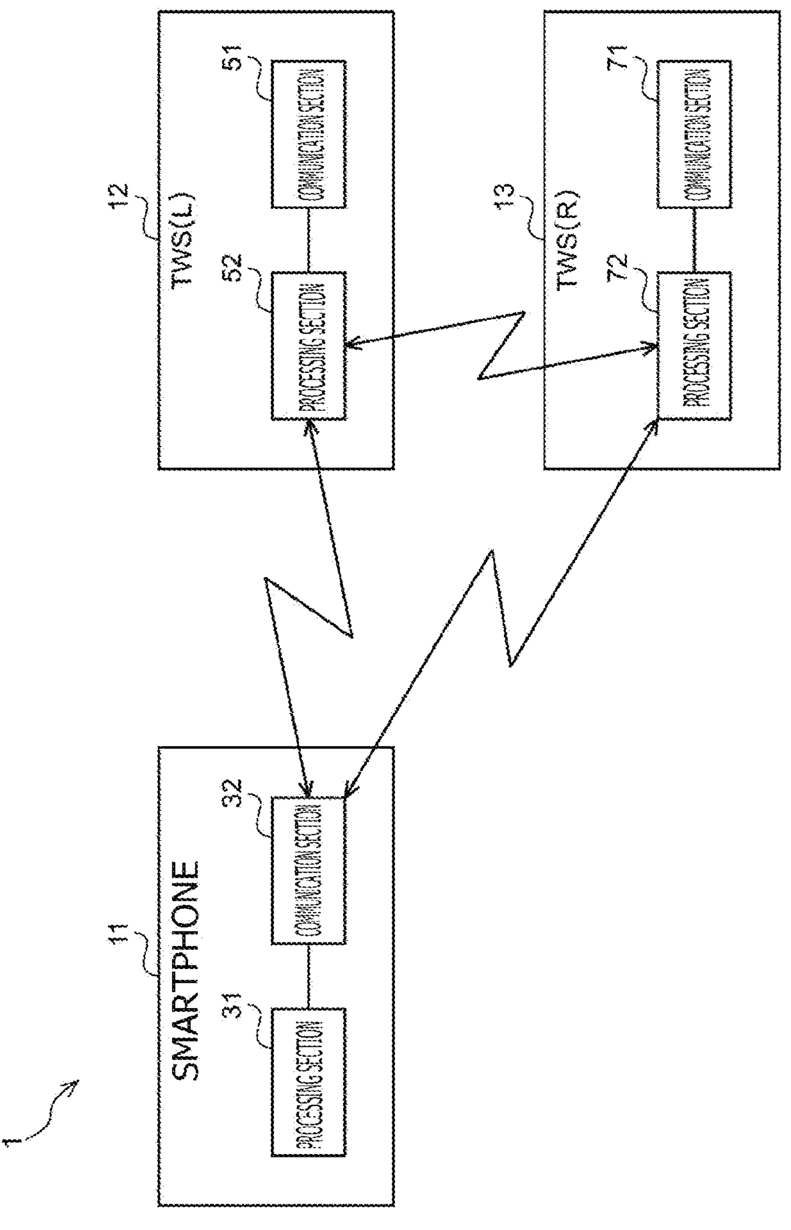
FIG. 1 is a block diagram depicting an example of a configuration of an embodiment of an information processing system to which the present technology is applied.

FIG. 1 is a block diagram depicting an example of a configuration of an embodiment of an information processing system to which the present technology is applied.

Referring to FIG. 1, the information processing system 1 that is an embodiment of the information processing system to which the present technology is applied includes a smartphone 11, a TWS(L) (True Wireless Stereo(left): true wireless stereo (left side)) 12, and a TWS(R) (True Wireless Stereo(Right): true wireless stereo (right side)) 13.

Any two of the smartphone 11, TWS(L) 12 and TWS(R) 13 are connectable to each other by wireless communication that complies with a predetermined communication standard. It is assumed that, in the present embodiment, connection between the smartphone 11 and the TWS(L) 12 or the TWS(R) 13 and connection between the TWS(L) 12 and the TWS(R) 13 can be established to each other by wireless communication that complies with the Bluetooth (registered trademark) Low Energy standard (hereinafter referred to as BLE) that is one of the Bluetooth (registered trademark) standards. In the following description, the connection by wireless communication of the BLE between devices is referred to simply as connection, connection by the BLE, or the like.

However, the standard of wireless communication for connecting devices to each other may be any standard other than the BLE, and the same standard may not be applied to all wireless communication for connecting devices. Note that, herein, "system" means an aggregation of multiple components (devices, modules (parts), or the like), and it does not matter whether all the components are in the same housing or not. Hence, multiple devices that are accommodated in separate housings and connected to each other via a network and a single device including multiple modules accommodated in a single housing are both "system."

The smartphone 11 is a well-known information processing device. A processing section 31 and a communication section 32 are component sections relating to wireless communication with the TWS(L) 12 and the TWS(R) 13 among component sections included in the smartphone 11.

The processing section 31 executes a program stored in a storage section (not depicted) to execute processes according to the program. The processing section 31 supplies data (data body) such as sound data to be transmitted to the TWS(L) 12 or the TWS(R) 13 connected to the smartphone 11 to the communication section 32. The processing section 31 acquires data (data body) transmitted from the TWS(L) 12 or the TWS(R) 13 connected to the smartphone 11 via the communication section 32.

The communication section 32 performs such processes as encapsulation, modulation, and so forth for the data body supplied from the processing section 31. Consequently, the communication section 32 generates transmission data (packet of a predetermined bit length) that complies with the BLE and transmits the transmission data as a radio wave to the TWS(L) 12 or the TWS(R) 13. The communication section 32 receives transmission data transmitted as a radio wave from the TWS(L) 12 or the TWS(R) 13 connected to the smartphone 11. The communication section 32 performs such processes as demodulation, decapsulation, and so forth for the received transmission data and supplies the data body to the processing section 31.

It is to be noted that the smartphone 11 is an example and may otherwise be any device such as a personal computer, a music reproduction device, or a portable terminal.

The TWS(L) 12 and the TWS(R) 13 represent such devices as an earphone or a speaker ready for the true wireless stereo. The TWS(L) 12 and the TWS(R) 13 are used in combination as devices for the left (for left side disposition) and the right (for right side disposition), and the TWS(L) 12 is a device used for the left and the TWS(R) 13 is a device used for the right.

A processing section 51 and a communication section 52 are component sections relating to wireless communication of the smartphone 11 and the TWS(R) 13 from among component sections included in the TWS(L) 12.

The processing section 51 executes a program stored in a storage section (not depicted) to execute processes according to the program. The processing section 51 supplies data (data body) to be transmitted to the smartphone 11 or the TWS(R) 13 connected to the TWS(L) 12 to the communication section 52. The processing section 51 acquires data (data body) transmitted from the smartphone 11 or the TWS(R) 13 connected to the TWS(L) 12 via the communication section 52.

The communication section 52 performs such processes as encapsulation and modulation for the data body supplied from the processing section 51. Consequently, the communication section 52 generates transmission data (packet of a predetermined bit length) that complies with the BLE and transmits the transmission data as a radio wave to the smartphone 11 or the TWS(R) 13 connected to the TWS(L) 12. The communication section 52 receives the transmission data (packet) transmitted as a radio wave from the smartphone 11 or the TWS(R) 13 connected to the TWS(L) 12. The communication section 52 performs such processes as demodulation and decapsulation for the received transmission data and supplies the data body to the processing section 51.

A processing section 71 and a communication section 72 are component sections relating to wireless communication with the smartphone 11 and the TWS(L) 12 from among component sections included in the TWS(R) 13. The processing section 71 and the communication section 72 correspond to the processing section 51 and the communication section 52 of the TWS(L) 12, and since processes of the processing section 71 and the communication section 72 are same as those of the processing section 51 and the communication section 52, description thereof is omitted.

In a case in which the TWS(L) 12 and the TWS(R) 13 are connected to the smartphone 11 by the BLE and perform data communication of the GATT (Generic Attribute Profile) specifications, for example, the following connection forms are available.

In one connection form, the smartphone 11 serves as a master (parent device), and any one of the TWS(L) 12 and the TWS(R) 13 (for example, the TWS(L) 12) is connected as a slave (child device) to the smartphone 11. The TWS(L) 12 connected as the slave to the smartphone 11 simultaneously serves as a master with respect to the other TWS(R)

13 while the TWS(R) 13 serves as a slave, and the TWS(L) 12 and the TWS(R) 13 are connected to each other. According to this, in a case in which, for example, stereo sound data is transmitted from the smartphone 11 to the TWS(L) 12, the TWS(L) 12 separates the stereo sound data into sound data for the left and sound data for the right. The TWS(L) 12 reproduces the sound data for the left. The TWS(L) 12 transmits the separated sound data for the right to the TWS(R) 13, and the TWS(R) 13 reproduces the sound data for the right.

In another connection form, the smartphone 11 serves as a master, and the TWS(L) 12 and the TWS(R) 13 are connected in parallel to each other as slaves to smartphone 11. In this case, when the smartphone 11 has a function of transmitting sound data for the left and sound data for the right individually, the sound data for the left is transmitted from the smartphone 11 to the TWS(L) 12, and the TWS(L) 12 reproduces the sound data for the left. The sound data for the right is transmitted from the smartphone 11 to the TWS(R) 13, and the TWS(R) 13 reproduces the sound data for the right.

In a case in which the TWS(L) 12 and the TWS(R) 13 are connected to the smartphone 11 by the BLE and broadcast communication is to be performed, the smartphone 11 is determined as a slave (broadcaster), and the TWS(L) 12 and the TWS(R) 13 are connected in parallel to each other as masters (observers) to the smartphone 11. In this case, for example, the same sound data is transmitted from the smartphone 11 to the TWS(L) 12 and the TWS(R) 13, and each of the TWS(L) 12 and the TWS(R) 13 reproduces the sound data.

Incidentally, when each of the TWS(L) 12 and the TWS (R) 13 establishes connection to a device such as the smartphone 11 other than a device that is used in combination with each of the TWS(L) 12 and the TWS(R) 13 to establish communication therebetween, each of the TWS(L) 12 and the TWS(R) 13 refers to a white list possessed thereby. The white list is information including a list of device information regarding devices to which connection is to be permitted (connection permission device information). The device information is identification information for identifying a device and is also called, for example, device ID. Devices that are used in combination are referred to also as set devices or set equipment.

In regard to a device whose device ID is included in the white list possessed by each of the TWS(L) 12 and the TWS(R) 13, each of the TWS(L) 12 and the TWS(R) 13 permits connection thereto as a device registered in the white list. In regard to a device whose device ID is not included in the white list possessed by each of the TWS(L) 12 and the TWS(R) 13, each of the TWS(L) 12 and the TWS(L) 12 unconditionally rejects connection thereto or permits or rejects connection thereto on the basis of a predetermined operation by the user. It is to be noted that processes of the TWS(L) 12 and the TWS(R) 13 in regard to connection to a device that is registered in the white list or to a device that is not registered in the white list is not limited to a particular case.

The white lists included in the TWS(L) 12 and the TWS(R) 13 can be updated from a device connected to the TWS(L) 12 and the TWS(R) 13, for example, like the smartphone 11. It is to be noted that updating to the white list refers to addition of a device ID to the white list or deletion of a device ID from the white list. For example, the user connects the TWS(L) 12 or the TWS(R) 13 as a target whose white list is to be updated with the smartphone 11 by the BLE. The user sets the updating contents of the white list on the smartphone 11 and transmits the updating contents to the relevant TWS(L) 12 or the relevant TWS(R) 13 by the BLE. The TWS(L) 12 or the TWS(R) 13 acquires the updating contents of the white list and updates the white list with the acquired updating contents (details are hereinafter described).

Such set devices as the TWS(L) 12 and the TWS(R) 13 are frequently desirable to have the same white list because they are connected in common to the same device. Therefore, the white lists of the TWS(L) 12 and the TWS(R) 13 that are set devices are updated with the same contents. On the other hand, if the user repeatedly performs a work for updating the white list of each of the TWS(L) 12 and the TWS(R) 13, then this requires much labor and time. Therefore, in the information processing system 1 to which the present technology is applied, updating of the white lists is performed by such a sequence as described below to achieve reduction of labor and time required for updating of the white lists of the set devices. It is to be noted that the present technology can be applied not only to updating of the white lists of the set devices but also updating of white lists of devices to which a device which permits connection thereto is in common. The devices to which a device which permits connection thereto is in common (which have a common white list) are regarded as set devices.

Figure 2:
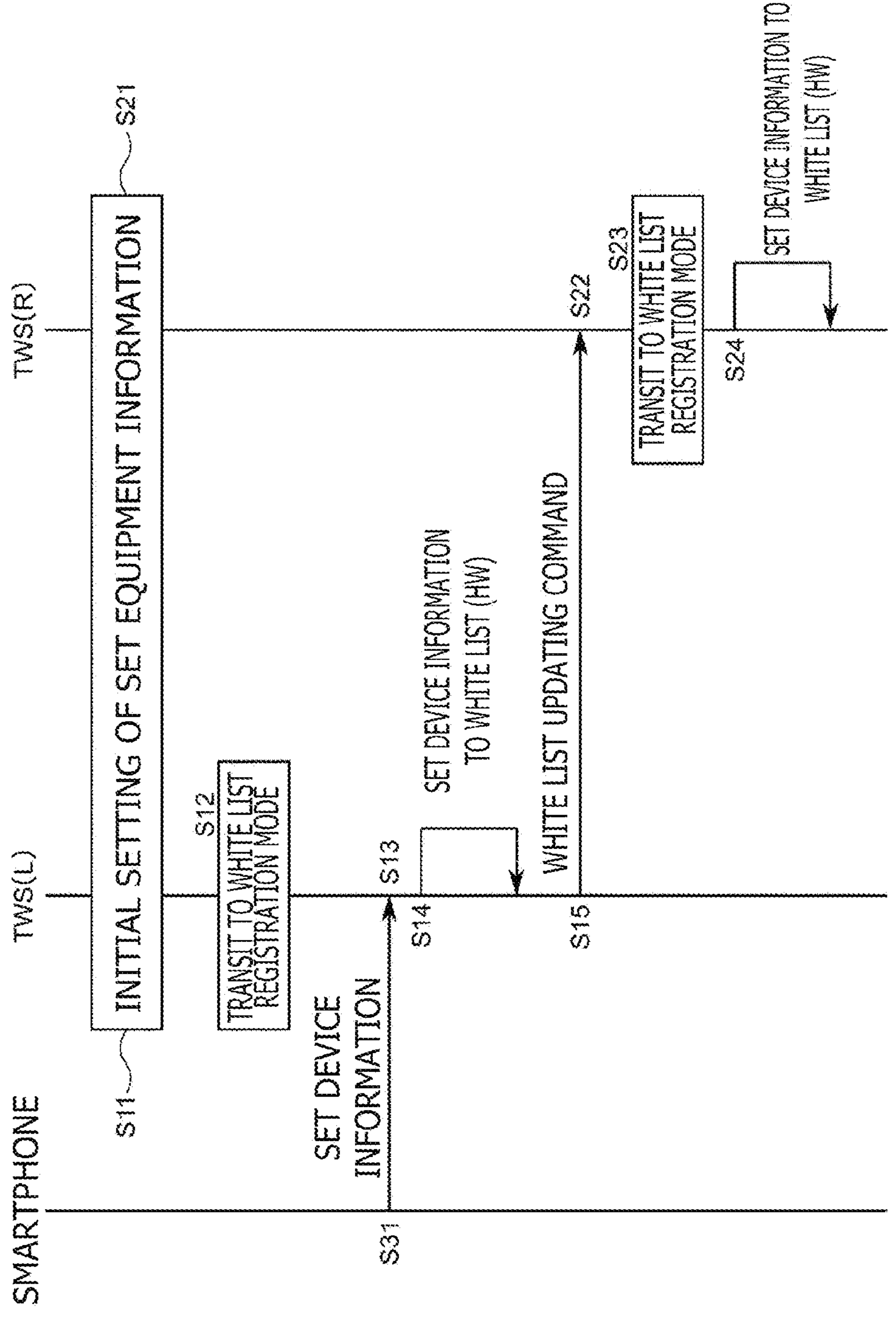
FIG. 2 is a sequence diagram relating to updating of a white list in the information processing system of FIG. 1.

FIG. 2 is a sequence diagram relating to updating of a white list in the information processing system 1 of FIG. 1.

It is assumed that the TWS(L) 12 is in a state in which it is connected to the smartphone 11 by the BLE and the TWS(R) 13 is in a state in which it is connected to the TWS(L) 12 by the BLE.

In step S11, the TWS(L) 12 performs initial setting of set equipment information. The set equipment information (updating device information) is information including a list of device IDs of set devices and is information including device IDs of devices that perform updating of the white list with the same contents. The set equipment information is possessed by all of the set devices, and the TWS(L) 12 sets the device ID of the TWS(R) 13 as the set equipment information possessed by the TWS(L) 12 itself. It is to be noted that the setting of the set equipment information may be performed by a predetermined operation of the user (including a setting operation using the smartphone 11 or the like) or may be set in a state in which the TWS(L) 12 is commercially available as a product. If setting of set equipment information is performed once, it need not be performed every time updating of the white list is performed as long as it is changed.

In step S21, the TWS(R) 13 performs initial setting of set equipment information similarly to the TWS(L) 12. The TWS(R) 13 sets the device ID of the TWS(L) 12 as the set equipment information possessed by the TWS(R) 13 itself.

In step S12, the TWS(L) 12 transitions to a white list registration mode. The white list registration mode represents a mode (state) in which updating of the white list is possible. Not only in a case in which a device ID is to be added to the white list, but also in a case in which a device ID is to be deleted from the white list, the TWS(L) 12 is set to the white list registration mode. For example, if a switch or the like provided on the TWS(L) 12 is operated by the user, then the TWS(L) 12 transitions to the white list registration mode. It is to be noted that a setting method of a white registration mode is not limited to a particular method.

In step S31, the smartphone 11 transmits a command for the instruction to update the white list to the TWS(L) 12 after step S12. It is assumed that also the updating contents are included in the command. In FIG. 2, since a case in which, as updating of the white list, a predetermined device ID (device information) is added (set) to the white list is exemplified, a command for an instruction to set device information (including device information to be added) is transmitted from the smartphone 11 to the TWS(L) 12.

In step S13, the TWS(L) 12 receives the command transmitted from the smartphone 11 in step S31.

In step S14, the TWS(L) 12 updates the white list according to the command received in step S13. Since the command received in step S13 is a command for the instruction to add predetermined device information to the white list, the TWS(L) 12 adds (sets) the device information included in the command to the white list.

In step S15, the TWS(L) 12 transmits a command (white list updating command) for an instruction to update the white list with the same contents as those in the updating of the white list performed in step S14 to the TWS(R) 13 registered in the set equipment information.

In step S22, the TWS(R) 13 receives the white list updating command transmitted from the TWS(L) 12 in step S15.

In step S23, the TWS(R) 13 transitions to the white list registration mode according to the white list updating command received in step S22. The TWS(R) 13 is automatically set, while an operation of the user is not performed, to the white registration mode in which updating of the white list is possible arising from the white list updating command.

In step S24, the TWS(R) 13 updates the white list according to the white list updating command received in step S22. The white list updating command received in step S22 is a command for the instruction to update with the same contents as those in the updating of the white list performed in step S14 by the TWS(L) 12. Accordingly, the TWS(R) 13 adds (sets) the device information included in the white list updating command to the white list.

According to the sequence of FIG. 2 described above, if the white list of any one of the set devices registered in the set equipment information is updated, then the white list of another device is automatically updated with the same contents. Accordingly, the user need not repeat a work for updating the white lists of the set devices, and labor and time required for updating of the white lists are reduced.

Figure 3:
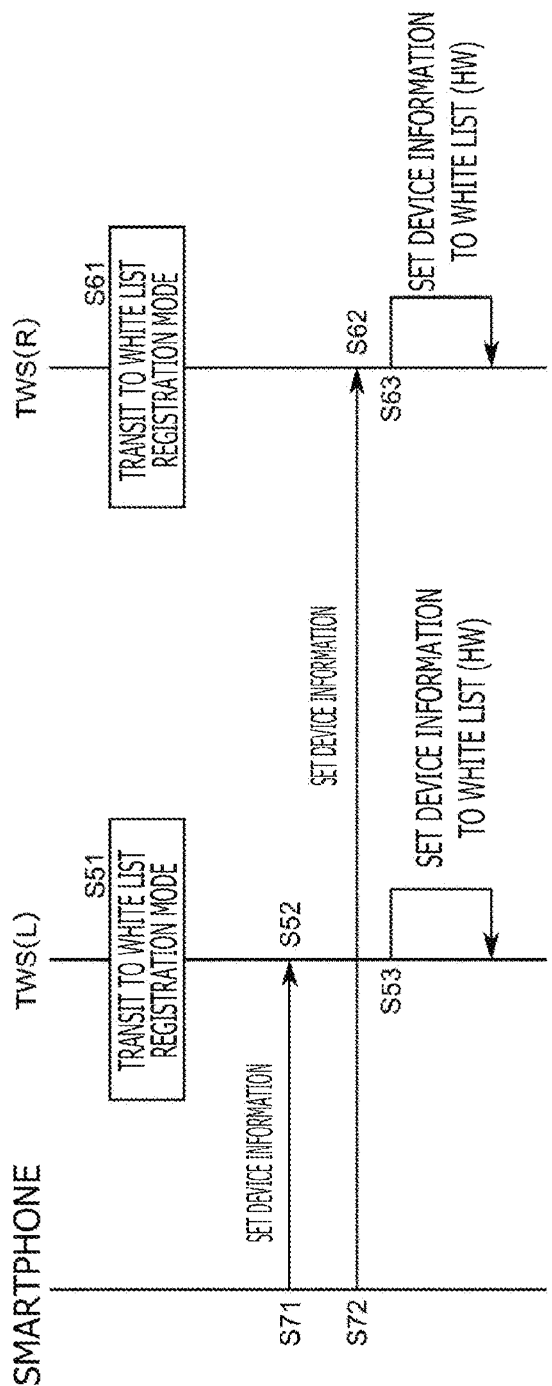
FIG. 3 is a sequence diagram in a case in which white lists of devices used in combination are updated individually.

For the comparison with the sequence relating to updating of the white lists in the information processing system 1 to which the present technology is applied, a sequence diagram in a case in which the white lists of the set devices are updated individually is depicted in FIG. 3.

Referring to FIG. 3, it is assumed that the TWS(L) 12 and the TWS(R) 13 are in a state individually connected to the smartphone 11 by the BLE.

In step S51, the TWS(L) 12 transitions to the white list registration mode. For example, in response to an operation by the user of a switch or the like provided on the TWS(L) 12, the TWS(L) 12 transitions to the white list registration mode.

In step S61, the TWS(R) 13 transmits to the white list registration mode similarly to the TWS(L) 12. For example, in response to an operation by the user of a switch or the like provided on the TWS(L) 12, the TWS(L) 12 transitions to the white list registration mode.

In step S71, the smartphone 11 transmits a command for the instruction to update the white list to the TWS(L) 12 after step S51. In FIG. 3, a case is exemplified in which a predetermined device ID (device information) is to be added (set) to the white list as updating of the white list similarly as in FIG. 2, and therefore, a command for the instruction to set device information (including the device information to be added) is transmitted from the smartphone 11 to the TWS(L) 12.

In step S52, the TWS(L) 12 receives the command transmitted from the smartphone 11 in step S71.

In step S53, the TWS(L) 12 updates the white list according to the command received in step S52. Since the command received in step S52 is a command for the instruction to add predetermined device information to the white list, the TWS(L) 12 adds (sets) the device information included in the command to the white list.

In step S72, the smartphone 11 transmits a command for the instruction to update the white list to the TWS(R) 13 after step S61. At this time, the smartphone 11 transmits a command of the updating contents same as those in the command transmitted to the TWS(L) 12 in step S71 to the TWS(R) 13. In particular, the smartphone 11 transmits a command for the instruction to set device information (including the device information to be added) to the TWS (R) 13.

In step S62, the TWS(R) 13 receives the command transmitted from the smartphone 11 in step S72.

In step S63, the TWS(R) 13 updates the white list according to the command received in step S62. Since the command received in step S62 is a command for the instruction to add predetermined device information to the white list, the TWS(R) 13 adds (sets) the device information included in the command to the white list.

According to the sequence of FIG. 3 described above, the smartphone 11 transmits commands of the same updating contents to the TWS(L) 12 and the TWS(R) 13 in step S71 and step S72. In the sequence of FIG. 2, the smartphone 11 transmits, in step S31, a command only to the TWS(L) 12. Though not described in the foregoing description, when the command to update the white list is to be transmitted from the smartphone 11, it is necessary for the user to perform an operation for setting the updating contents of the white list and an operation for transmitting a command. Therefore, although, in the sequence of FIG. 3, it is necessary for the user to repeat similar operations twice, in the sequence of FIG. 2 to which the present technology is applied, it is not necessary for the user to repeat similar operations, and therefore, labor and time required to update the white lists of the set devices are reduced.

According to the sequence of FIG. 3, when updating of the white lists is to be performed, it is necessary for the user to operate both of the TWS(L) 12 and the TWS(R) 13 in step S51 and step S61 to set the white list registration mode. In the sequence of FIG. 2, the user operates only the TWS(L) 12 to set the white list registration mode in step S12, and the TWS(R) 13 is automatically set to the white list registration mode in step S23. Therefore, while, in the sequence of FIG. 3, it is necessary for the user to repeat similar operations for both of the TWS(L) 12 and the TWS(R) 13, in the sequence of FIG. 2 to which the present technology is applied, it is not necessary to repeat similar operations, and labor and time required for updating of the white lists of the set devices are reduced.

Especially, the present technology can be applied also to a case in which the number of set devices is greater than two. For example, also a case is conceivable in which the set devices are, for example, 7.1-ch speakers that are connectable to other devices by the BLE in place of two of the TWS(L) 12 and the TWS(R) 13. In this case, each of the eight 7.1-ch speakers has a white list, and when the white lists are to be updated, in the sequence of FIG. 2, it is necessary for the user to repeat a similar operation eight times. In contrast, in the sequence of FIG. 2, it is not necessary to repeat a similar operation. Accordingly, according to the sequence of FIG. 2, labor and time required for updating of the white lists are reduced significantly.

Figure 4:
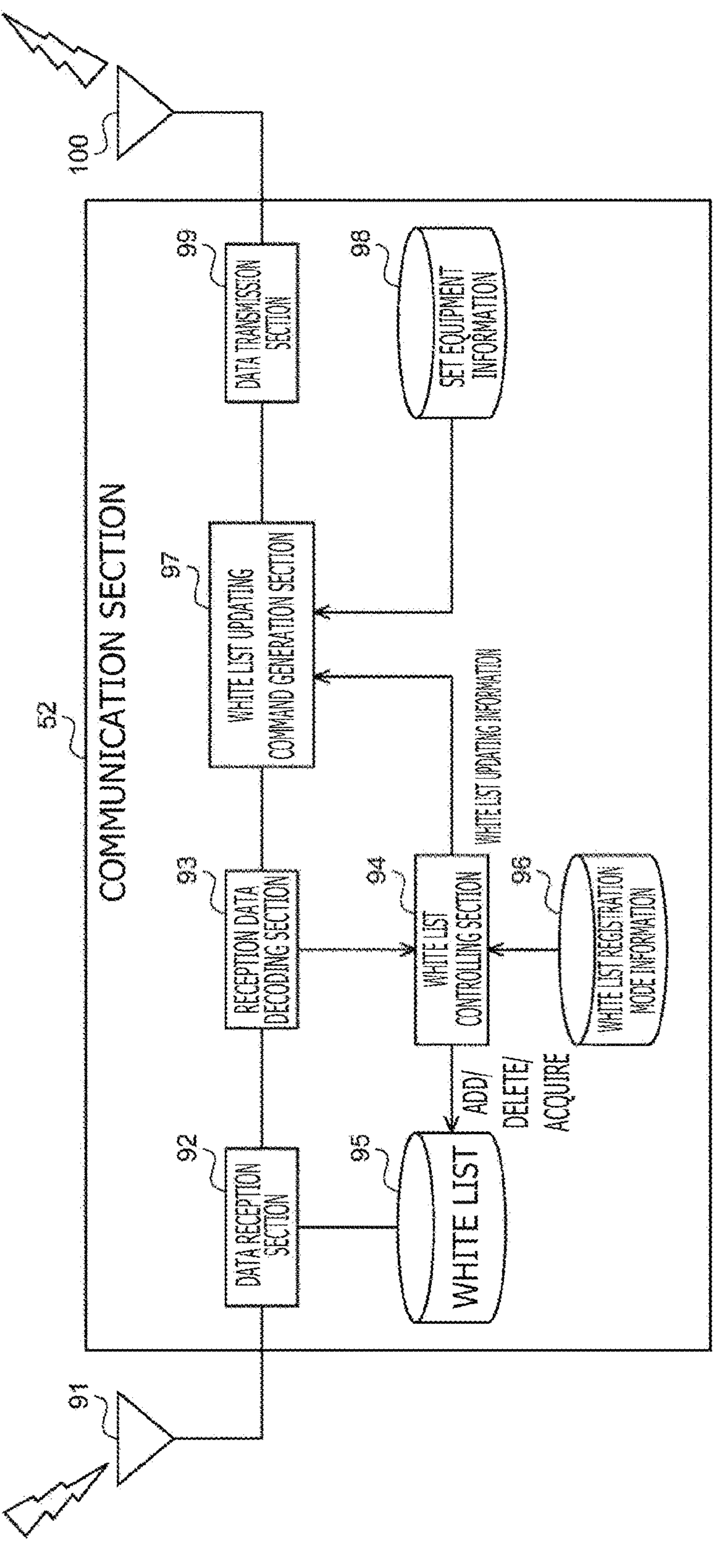
FIG. 4 is a block diagram depicting an example of a configuration of a communication section of a TWS(L) of FIG. 1.

FIG. 4 is a block diagram depicting an example of a configuration of the communication section 52 of the TWS (L) 12 of FIG. 1 that performs updating of the white list according to the sequence of FIG. 2. It is to be noted that the communication section in the set devices has a configuration similar to that of FIG. 4. However, the communication section of a set device that performs updating of the white list first by a device such as the smartphone 11 and the communication section of other set devices are partly different in the processing contents. The TWS(L) 12 of FIG. 1 is a set device that updates the white list first in the sequence of FIG. 2. A configuration of the communication section is described on the basis of processing of the communication section 52 of the TWS(L) 12 as the set device that performs updating of the white list first with reference to FIG. 4. From among the set devices, the device that can perform updating of the white list first may be only a particular device or may be a freely selected device. It is to be noted that the device (TWS(L) 12) that performs updating of the white list first from among the set devices is referred to as initial updating device and a device (TWS(R) 13) other than the initial updating devices from among the set devices is referred to as non-initial updating device. In a case in which a freely selected device from among set devices or any one of two or more of the set devices can be set as an initial updating device, for example, a device set to the white list registration mode by an operation of the user, or the like or a device designated as an initial updating device by an operation of the user, or the like becomes the initial updating device.

Referring to FIG. 4, the communication section 52 includes a reception antenna 91, a data reception section 92, a reception data decoding section 93, a white list controlling section 94, a white list 95 (storage section), white list registration mode information 96 (storage section), a white list updating command generation section 97, set equipment information 98 (storage section), a data transmission section 99, and a transmission antenna 100.

The reception antenna 91 receives a radio wave of the BLE outputted from a device such as the smartphone 11 and supplies the received radio wave as an electric signal to the data reception section 92.

The data reception section 92 receives transmission data (packet), which has been modulated and transmitted as a radio wave by a device of the transmission source, as reception data according to an electric signal from the reception antenna 91. The data reception section 92 demodulates the received reception data and detects the device ID of the device of the transmission source included in the reception data. The data reception section 92 collates the detected device ID with the white list 95, and determines, in a case in which the detected device ID is included in the white list 95 (set to the white list 95), the device of the transmission source as a device to which connection is to be permitted. In this case, the data reception section 92 supplies the reception data to the reception data decoding section 93. In a case in which the detected device ID is not set to the white list 95, the data reception section 92 determines that the device of the transmission source is a device to which connection is not to be permitted (connection is to be rejected). In this case, the data reception section 92 discards the reception data without supplying it to the reception data decoding section 93. However, the process in a case in which the device ID of the device of the transmission source is not set to the white list 95 is not limited to this. It is to be noted that, in a case in which the device ID detected from the reception data is the device ID of a device to which connection by the BLE is already established to be in a connection state, the data reception section 92 does not perform the collation with the white list 95 and supplies the reception data to the reception data decoding section 93.

The reception data decoding section 93 analyzes the reception data from the data reception section 92. As a result of the analysis, in a case in which the result of the analysis indicates that the white list updating command is included in the reception data, the reception data decoding section 93 supplies the updating contents included in the white list updating command to the white list controlling section 94. The updating contents include information regarding the operation contents indicative of addition or deletion of a device ID to or from the white list 95 and information regarding the device ID in a case in which the device ID is to be added or where the device ID is to be deleted. In a case in which the white list updating command is included in the reception data, the reception data decoding section 93 notifies the white list updating command generation section 97 of this effect.

The reception data decoding section 93 performs such a process as decapsulation and so forth for the reception data, irrespective of whether or not the white list updating process is included in the reception data and supplies the data body included in the reception data to the processing section 51 of FIG. 1. This allows the processing section 51 to perform a process according to the contents of the reception data. It is to be noted that the process of supplying the data body included in the reception data to the processing section 51 may be performed otherwise by a configuration section not depicted. The process of the reception data decoding section 93 may be performed by the processing section 51.

The white list controlling section 94 acquires white list registration mode information 96 in a case in which the updating contents of the white list 95 are supplied from the reception data decoding section 93. The white list registration mode information 96 is information indicative of whether or not a device is set to the white list registration mode in which updating of the white list 95 is possible and represents whether or not the user has set the TWS(L) 12 to the white list registration mode by a predetermined operation. It is to be noted that, in a case in which the communication section 52 serves as the communication section of a non-initial updating device other than the initial updating device that is to perform updating of the white list first from among the set devices, when the white list updating command is included in the reception data, the white list controlling section 94 regards that the white list registration mode information 96 is set to the white list registration mode without referring to the white list registration mode information 96 (irrespective of an operation of the user). Alternatively, in a case in which the communication section 52 serves as the communication section of a non-initial updating device, when the white list updating command is included in the reception data, it may be indicated that the white list registration mode information 96 is set to the white list registration mode.

In a case in which the white list registration mode information 96 indicates that the device is set to the white list registration mode, the white list controlling section 94 updates the white list 95 according to the updating contents supplied from the reception data decoding section 93.

In a case in which the white list registration mode information 96 indicates that the device is not set to the white list registration mode, the white list controlling section 94 does not update the white list 95 even in a case in which the updating contents are supplied from the reception data decoding section 93. It is to be noted that, in a case in which the updating contents are supplied from the reception data decoding section 93, when the device is not set to the white list registration mode, the white list controlling section 94 may allow the user to select whether or not the device is to be set to the white list registration mode (whether or not updating of the white list 95 is to be permitted).

In a case in which the white list updating command generation section 97 is notified from the reception data decoding section 93 that the white list updating command is included in the reception data, it acquires the updating contents performed for the white list 95 from the white list controlling section 94. It is to be noted that, in a case in which the white list controlling section 94 does not perform updating of the white list 95 because the device is not set to the white list registration mode, the white list updating command generation section 97 does not acquire the updating contents of the white list 95.

In a case in which the white list updating command generation section 97 acquires the updating contents of the white list 95 from the white list controlling section 94, it refers to the set equipment information 98 to acquire the device ID included in the set equipment information 98. The set equipment information 98 is information included in a list of device IDs of the set devices that are used in combination with the TWS(L) 12. In the case of FIG. 1, the device ID of the TWS(R) 13 is included in the set equipment information 98. The set equipment information 98 may be information included in a list of device IDs of devices that are to update the white list with the same contents as those of the white list 95 of the TWS(L) 12. The set equipment information 98 is set in advance by an operation of the user or the like.

The white list updating command generation section 97 generates transmission data including a white list updating command by determining the device (set device) of the device ID included in the set equipment information 98 as a device of the transmission determination. The white list updating command is a command for the instruction to update the white list with the updating contents acquired from the white list controlling section 94. The white list updating command generation section 97 supplies the generated transmission data to the data transmission section 99.

The data transmission section 99 performs modulation and so forth for the transmission data from the white list updating command generation section 97 and outputs the resulting transmission data as a radio wave of the BLE from the transmission antenna 100. The transmission data outputted as a radio wave from the transmission antenna 100 is received as reception data including the white list updating command by the device of the device ID designated as the transmission destination (TWS(R) 13 that is a set device). In the device (TWS(R) 13) that receives the reception data including the white list updating command, the white list is updated with the updating contents included in the white list updating command by a communication section (communication section 72 of FIG. 1) similar to the communication section 52. It is to be noted that, when the communication section of a non-initial updating device (TWS(R) 13) other than the initial updating device (TWS(L) 12) that is to perform updating of the white list first from among the set devices receives the white list updating command from the initial updating device, it regards, for example, that the white list registration mode information is set to the white list registration mode. Therefore, for the non-initial updating device, an operation of the user for setting it to the white list registration mode is unnecessary. However, also in the non-initial updating device, updating of the white list may be performed only in a case in which the device is set to the white list registration mode by an operation of the user.

Figure 5:
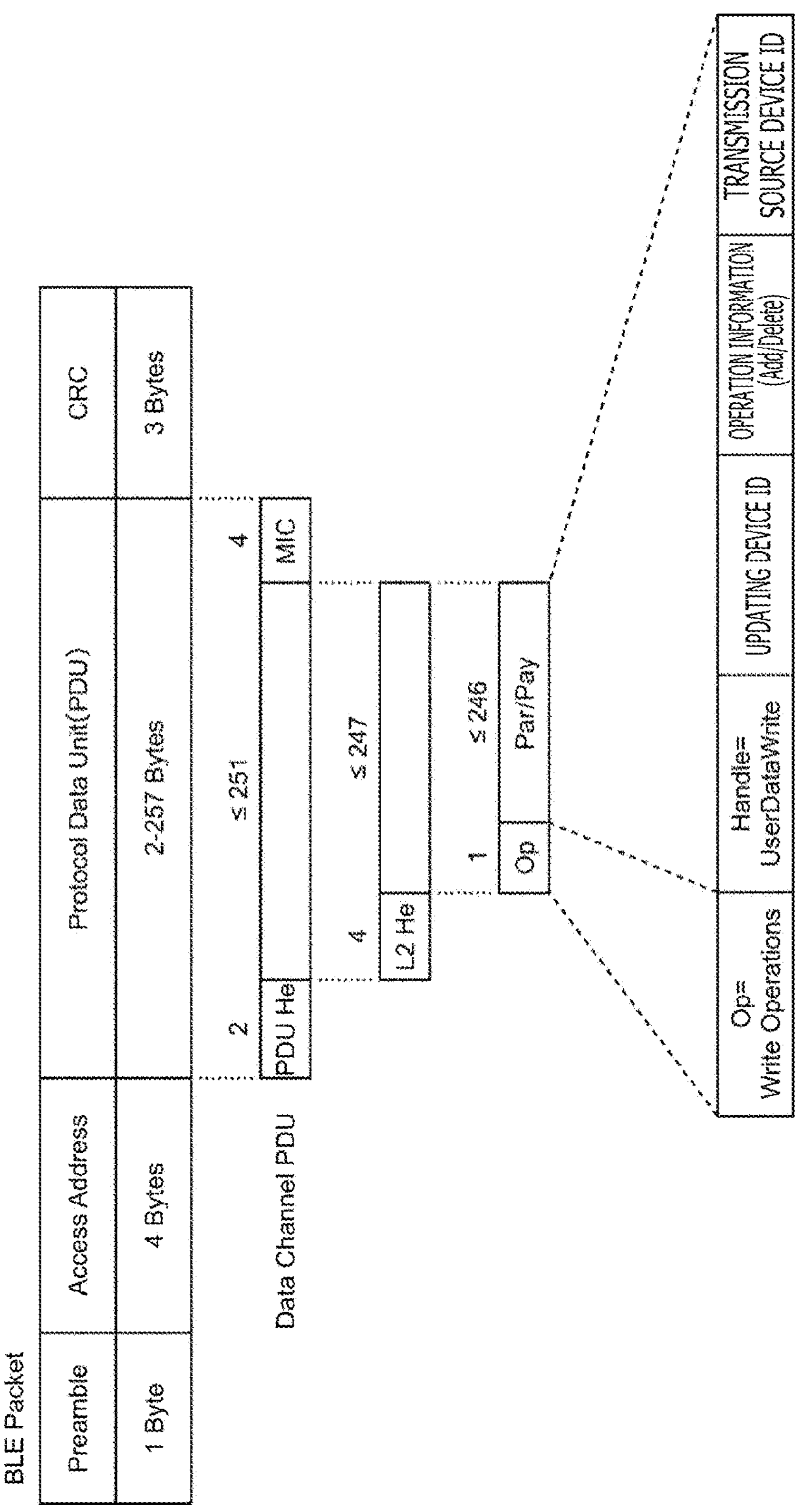
FIG. 5 is a view depicting an example of a configuration of transmission data (BLE packet) generated by a white list updating command generation section.

FIG. 5 is a diagram depicting an example of a configuration of transmission data (BLE packet) generated by the white list updating command generation section 97.

The transmission data generated by the white list updating command generation section 97 has a structure of a data packet of the GATT specifications of the BLE. Describing the data packet of FIG. 5 with part thereof omitted, the data packet of the BLE includes a "Preamble" field, an "Access Address" field, a "PDU" (protocol data unit) field, and a "CRC" (Cyclic Redundancy Check) field. To the "Access Address," the device ID of a device of the transmission destination is set.

In the "PDU" field, a data body (data of the application layer) to be transmitted to the device of the transmission destination is included. The "PDU" field includes a "PDU He" (PDU Header) field, a Payload field that is blank, and an "MIC" (Message Integrity Check) field. The Payload field is the data body to be transmitted from the transmission side device of a packet to the reception side device.

The Payload field further includes an "L2 He" (L2CAP Header) field and an upper layer Payload field that is blank. The upper layer Payload field is a Payload field of an upper layer of the L2CAP layer, and to this upper layer Payload field, a command "OP=Write Operations" for the instruction to update the white list, an updating device ID, operation information, and a transmission source device ID are set.

The updating device ID indicates a device ID to be added to or deleted from the white list. The operation information indicates whether the updating of the white list is addition or deletion. The transmission source device ID indicates the device ID of the device from which transmission data is transmitted. The transmission source device ID can be used in order for the device that receives the transmission data to collate it with the set equipment information to determine whether or not the device of the transmission source is a set device.

It is to be noted that the white list updating command of such a structure as depicted in FIG. 5 can be used also as a command for causing the smartphone 11 to instruct the device (TWS(L) 12 of FIG. 1), which is to perform updating of the white list first, to update the white list.

It is to be noted that the method by the initial updating device (TWS(L) 12), which is a device that is to perform updating of the white list first from among the set devices, for updating the white list of the other non-initial updating device (TWS(R) 13) that is a device other than the initial updating device from among the set devices is not limited to a particular method. For example, the initial updating device and the non-initial updating device may be connected to each other by wireless or wired communication of a communication standard other than the BLE. In this case, a white updating command for the instruction to update the white list with the same contents as those in the updating of the white list performed in the initial updating device is transmitted from the initial updating device to the non-initial updating device by communication of the communication standard. In a case in which the white list is updated, in order to update the white list, the initial updating device and the non-initial updating device may be connected to each other by wired or wireless communication of the predetermined standard. In a case in which the white list is updated, the connection between the initial updating device and a device for updating the white list of the non-initial updating device or the connection between the initial updating device and the non-initial updating device is not limited to the connection by communication of a communication standard used for ordinary transmission and reception of data (communication of a target for determination of whether or not connection is to be permitted according to the white list) but may be connection by communication of a communication standard different from the communication standard.

Figure 6:
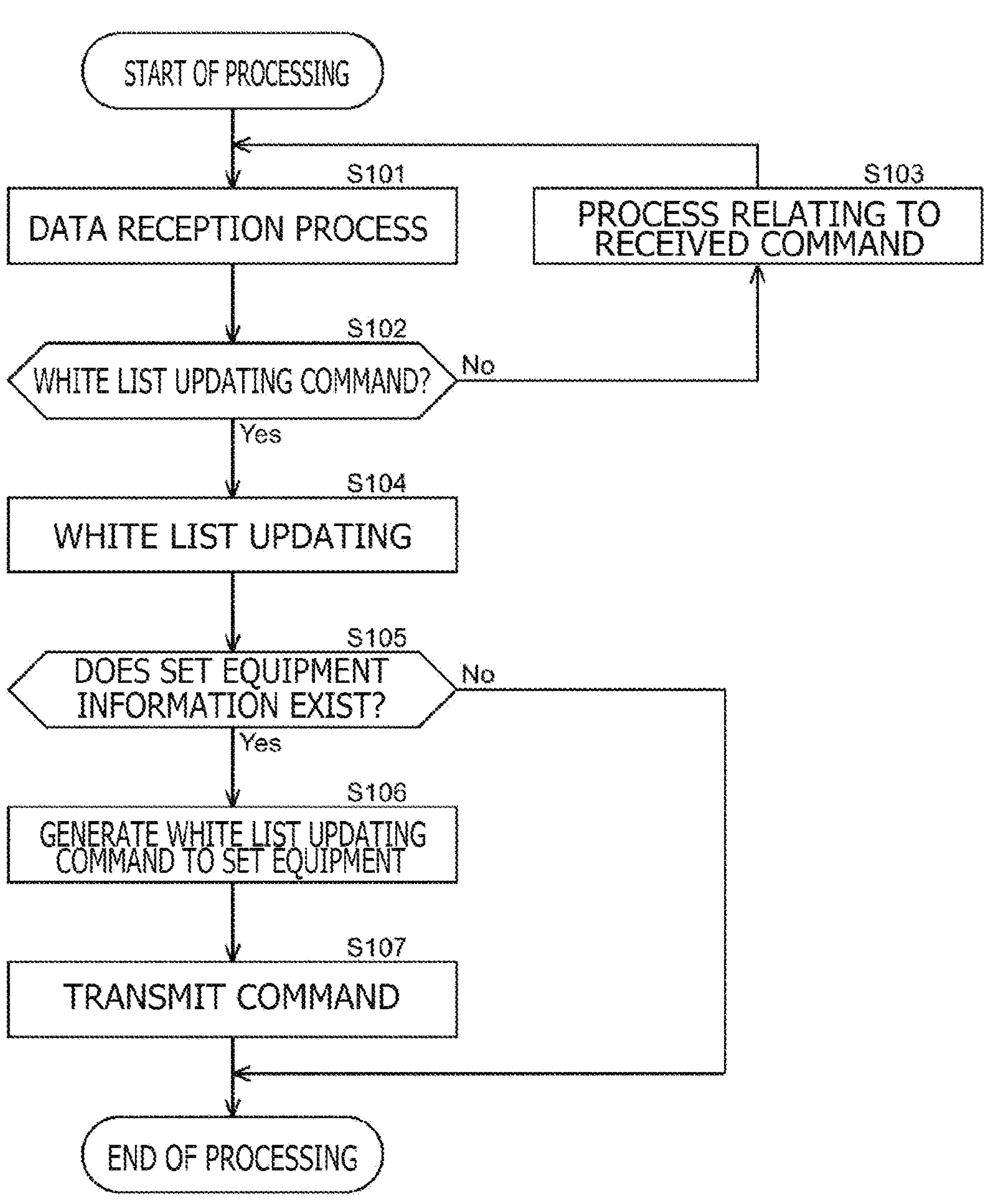
FIG. 6 is a flow chart exemplifying a processing procedure for updating of a white list performed by the communication section.

FIG. 6 is a flow chart exemplifying a processing procedure of updating of the white list performed by the communication section 52.

In step S101, the data reception section 92 receives transmission data transmitted by a radio wave of the BLE via the reception antenna 91 as reception data. The processing advances from step S101 to step S102.

In step S102, the reception data decoding section 93 determines whether or not a white list updating command is included in the reception data received in step S101.

In a case in which it is determined in step S102 that a white list updating command is not included in the reception data, the processing advances to step S103.

In step S103, the processing section 51 executes a process relating to a command included in the reception data received in step S101. The processing returns from step S103 to step S101 and is repeated from step S101.

In a case in which it is determined in step S102 that a white list updating command is included in the reception data, the processing advances to step S104.

In step S104, the white list controlling section 94 updates the white list 95 according to the updating contents included in the white list updating command. The processing advances from step S104 to step S105. However, in a case in which the device is not set to the white list registration mode, the white list controlling section 94 does not perform updating of the white list, and the processing returns to step S101. It is to be noted that, even if the device is not set to the white list registration mode and the white list updating command is included in the reception data, the white list controlling section 94 may perform updating of the white list.

In step S105, the white list updating command generation section 97 determines whether or not the set equipment information 98 exists (whether or not a device ID is set to the set equipment information 98).

In a case in which it is determined in step S105 that the set equipment information does not exist, the processing for updating of the white list is ended.

In a case in which it is determined in step S105 that the set equipment information exists, the processing advances to step S106.

In step S106, the white list updating command generation section 97 generates a white list updating command for the device of the device ID set to the set equipment information 98. The white list updating command generated in step S106 is a command for the instruction to update the white list with the same contents as those in the updating performed in step S104. The processing advances from step S106 to step S107.

In step S107, the data transmission section 99 transmits the white list updating command generated in step S106 to the device (set device) of the device ID set to the set equipment information 98 by a radio wave to be outputted from the transmission antenna 100.

In this manner described above, the process for updating the white list is ended.

According to the information processing system 1 and the communication section 52 described above, by updating the white list possessed by any one of set devices with use of a device such as the smartphone 11, updating of the white list of another device is performed automatically. Accordingly, there is no necessity to individually perform updating of the white lists of the set devices, and labor and time required to update the white list are reduced.

<Program>

While the series of processes by the TWS(L) 12, the TWS(R) 13, or the communication section 52 described above can be executed by hardware, it may otherwise be executed by software. In a case in which the series of processes is executed by software, a program that constructs the software is installed into a computer. The computer here includes a computer incorporated in hardware for exclusive use, a personal computer, for example, for universal use that can execute various types of functions by installing various types of programs, and so forth.

Figure 7:
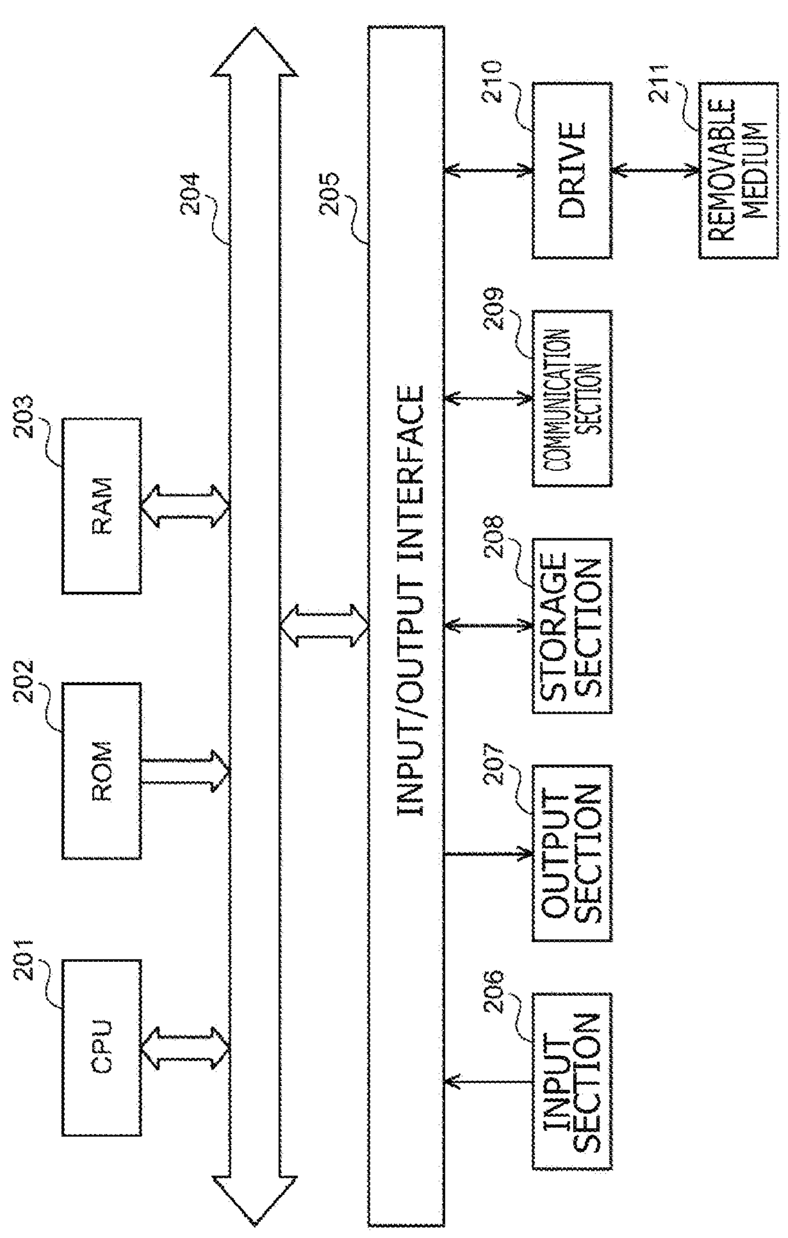
FIG. 7 is a block diagram depicting an example of a hardware configuration of a computer that executes a series of processes according to a program.

FIG. 7 is a block diagram depicting an example of a hardware configuration of a computer in a case in which the computer executes various processes to be executed by the TWS(L) 12, the TWS(R) 13, or the communication section 52 according to a program.

In the computer, a CPU (Central Processing Unit) 201, a ROM (Read Only Memory) 202, and a RAM (Random Access Memory) 203 are connected to one another by a bus 204.

Further, an input/output interface 205 is connected to the bus 204. An input section 206, an output section 207, a storage section 208, a communication section 209, and a drive 210 are connected to the input/output interface 205.

The input section 206 includes a keyboard, a mouse, a microphone, and so forth. The output section 207 includes a display, a speaker, and so forth. The storage section 208 includes a hard disk, a nonvolatile memory, or the like. The communication section 209 includes a network interface or the like. The drive 210 drives a removable medium 211 such as a magnetic disk, an optical disk, a magneto-optical disk, or a semiconductor memory.

In the computer configured in such a manner described above, the CPU 201 loads a program stored, for example, in the storage section 208 into the RAM 203 via the input/output interface 205 and the bus 204 and executes the program to carry out the series of processes described above.

The program to be executed by the computer (CPU 201) can be recorded on and provided as a removable medium 211, for example, in the form of a package medium or the like. Further, the program can be provided through a wired or wireless transmission medium such as a local area network, the Internet, or a digital broadcast.

In the computer, the program can be installed into the storage section 208 via the input/output interface 205 by loading the removable medium into the drive 210. Further, the program can be received by the communication section 209 through a wired or wireless transmission medium and installed into the storage section 208. Otherwise, the program can be installed in advance in the ROM 202 or the storage section 208.

Note that the program executed by the computer may be a program for executing the processes in chronological order described in the present specification or may be a program for executing the processes in parallel or at a necessary timing such as when the processes are invoked.

The present technology can also adopt the following configurations.

(1)

An information processing system including:

a plurality of information processing devices each having connection permission device information including identification information of a connection permission device to which connection by wireless communication is to be permitted, in which, in a case in which a predetermined information processing device from among the plurality of information processing devices performs predetermined updating for the connection permission device information of the predetermined information processing device, another information processing device from among the plurality of information processing devices acquires contents of the predetermined updating and performs updating for the connection permission device information of the other information processing device with the same contents as those of the predetermined updating.

(2)

The information processing system according to (1) above, in which the predetermined information processing device includes a freely selected information processing device from among the plurality of information processing devices.

(3)

The information processing system according to (1) or (2) above, in which the plurality of information processing devices includes information processing devices that are used in combination.

(4)

The information processing system according to any one of (1) to (3) above, in which the predetermined information processing device has updating device information configured from identification information of the other information processing device and transmits, in a case in which the predetermined information processing device performs the predetermined updating for the connection permission device information, the contents of the predetermined updating to the other information processing device that has the identification information included in the updating device information.

(5)

The information processing system according to (4) above, in which the predetermined information processing device transmits, together with the contents of the predetermined updating, a command for an instruction to perform updating of the same contents as those of the predetermined updating to the other information processing device, and, when the other information processing device receives the command, the other information processing device executes the predetermined updating for the connection permission device information of the other information processing device.

(6)

The information processing system according to any one of (1) to (5) above, in which the predetermined information processing device acquires the contents of the predetermined updating by the wireless communication.

(7)

The information processing system according to (6) above, in which the predetermined information processing device executes the predetermined updating for the connection permission device information only in a case in which the predetermined information processing device is set to a mode in which updating of the connection permission device information is possible.

(8)

The information processing system according to any one of (1) to (7) above, in which the predetermined updating for the connection permission device information includes addition of identification information of a new connection permission device to the connection permission device information or deletion of the identification information included in the connection permission device information.

(9)

The information processing system according to any one of (1) to (8) above, in which the wireless communication includes wireless communication that complies with the Bluetooth (registered trademark) standard.

(10)

The information processing system according to any one of (1) to (9) above, in which the information processing device includes devices ready for true wireless stereo.

(11)

An information processing device including:

a processing section that has connection permission device information including identification information of a connection permission device to which connection by wireless communication is to be permitted and transmits, in a case in which the processing section performs predetermined updating for the connection permission device information, contents of the predetermined updating to another information processing device.

(12)

The information processing device according to (11) above, in which the other information processing device that becomes a transmission destination to which the contents of the predetermined updating are to be transmitted includes an information processing apparatus that is used in combination with the information processing device.

(13)

The information processing device according to (11) or (12), in which the processing section has updating device information including identification information of the other information processing device that becomes a transmission destination to which the contents of the predetermined updating are to be transmitted.

(14)

The information processing device according to any one of (11) to (13) above, in which the processing section transmits a command for an instruction to perform updating of the same contents as those of the predetermined updating to the other information processing device.

(15)

The information processing device according to any one of (11) to (14) above, in which the processing section acquires the contents of the predetermined updating by the wireless communication.

(16)

The information processing device according to any one of (11) to (15) above, in which the processing section executes the predetermined updating for the connection permission device information only in a case in which the information processing device is set to a mode in which updating of the connection permission device information is possible.

(17)

The information processing device according to any one of (11) to (16) above, in which the predetermined updating for the connection permission device information includes addition of identification information of a new connection permission device to the connection permission device information or deletion of the identification information included in the connection permission device information.

(18)

The information processing device according to any one of (11) to (17) above, in which the wireless communication includes wireless communication that complies with the Bluetooth (registered trademark) standard.

(19)

An information processing method performed by a processing section included in an information processing device, in which the processing section has connection permission device information including identification information of a connection permission device to which connection by wireless communication is to be permitted, the information processing method including:

transmitting, in a case in which predetermined updating is performed for the connection permission device information, contents of the predetermined updating to another information processing device.

REFERENCE SIGNS LIST

1: Information processing system
11: Smartphone
12: TWS(L)
13: TWS(R)
52: Communication section
92: Data reception section
93: Reception data decoding section
94: White list controlling section
95: White list
96: White list registration mode information
97: White list updating command generation section
98: Set equipment information
99: Data transmission section

The invention claimed is:

1. An information processing system, comprising:

a plurality of information processing devices each having connection permission device information including identification information of a connection permission device to which connection by wireless communication is permitted, wherein a first information processing device from among the plurality of information processing devices is configured to:

acquire contents of a first updating operation by the wireless communication; and execute the first updating operation for the connection permission device information of the first information processing device, only in a case where the first information processing device is set to a mode in which the first updating operation of the connection permission device information is possible, and a second information processing device from among the plurality of information processing devices is configured to:

acquire the contents of the first updating operation; and execute a second updating operation for the connection permission device information of the second information processing device with same contents as those of the first updating operation.

2. The information processing system according to claim 1, wherein the first information processing device includes a freely selected information processing device from among the plurality of information processing devices.

3. The information processing system according to claim 1, wherein the plurality of information processing devices includes information processing devices that are used in combination.

4. The information processing system according to claim 1, wherein the first information processing device has updating device information configured from identification information of the second information processing device, and the first information processing device is further configured to transmit, based on the execution of the first updating operation for the connection permission device information by the first information processing device, the contents of the first updating operation to the second information processing device.

5. The information processing system according to claim 4, wherein the first information processing device is further configured to transmit the contents of the first updating operation and a command for an instruction to execute an updating operation of the same contents as those of the first updating operation, to the second information processing device; and the second information processing device is further configured to execute, in a case where the second information processing device receives the command, the first updating operation for the connection permission device information of the second information processing device.

6. The information processing system according to claim 1, wherein the first updating operation for the connection permission device information includes addition of identification information of a new connection permission device to the connection permission device information or deletion of the identification information included in the connection permission device information.

7. The information processing system according to claim 1, wherein the wireless communication includes wireless communication that complies with a Bluetooth protocol.

8. The information processing system according to claim 1, wherein the plurality of information processing devices includes devices ready for true wireless stereo.

9. A first information processing device, comprising:

a processor configured to:

execute a first updating operation for connection permission device information, wherein the first updating operation is executed only in a case where the first information processing device is set to a mode in which the first updating operation of the connection permission device information is possible, and the connection permission device information includes identification information of a connection permission device to which connection by wireless communication is permitted; and transmit contents of the first updating operation to a second information processing device.

10. The first information processing device according to claim 9, wherein the second information processing device, which is transmission destination to which the contents of the first updating operation are transmitted, includes an information processing apparatus that is used in combination with the first information processing device.

11. The first information processing device according to claim 9, wherein the first information processing device has updating device information which includes identification information of the second information processing device, and the second information processing device is a transmission destination to which the contents of the first updating operation are transmitted.

12. The first information processing device according to claim 9, wherein the processor is further configured to transmit a command for an instruction to execute a second updating operation of the same contents as those of the first updating operation to the second information processing device.

13. The first information processing device according to claim 9, wherein the processor is further configured to acquire the contents of the first updating operation by the wireless communication.

14. The first information processing device according to claim 9, wherein the first updating operation for the connection permission device information includes addition of identification information of a new connection permission device to the connection permission device information or deletion of the identification information included in the connection permission device information.

15. The first information processing device according to claim 9, wherein the wireless communication includes wireless communication that complies with a Bluetooth protocol.

16. An information processing method comprising:

executing, by a first information processing device, an updating operation for connection permission device information, wherein the updating operation is executed only in a case where the first information processing device is set to a mode in which the updating operation of the connection permission device information is possible, and the connection permission device information includes identification information of a connection permission device to which connection by wireless communication is permitted; and transmitting, by the first information processing device, contents of the updating operation to a second information processing device.

* * * * *